Patented Nov. 30, 1937

2,100,468

UNITED STATES PATENT OFFICE 2,100,468

CATALYTIC HYDROGENATION OF ALKYL SUBSTITUTED PHENOLS

Merlin Martin Brubaker and Benjamin W. Howk, Wilmington, Del., assignors to E. I. du Pont de Nemours & Company, Wilmington, Del., a corporation of Delaware No Drawing. Application October 30, 1935, Serial No. 47,428

25 Claims. (Cl. 260—153)

This invention relates to new compositions of matter and to processes for preparing them. More particularly it relates to alkyl cyclohexanols prepared by catalytic processes and more specifically this invention relates to the higher monoalkyl cyclohexanols, containing at least 7 carbon atoms in the substituent group, and to liquid phase catalytic hydrogenation processes for their preparation.

Catalytic hydrogenation of phenols such as the cresols and ethyl phenol has been discussed in the literature. These compounds, however, were hydrogenated at temperatures in excess of 200° C. and at moderate pressures. These conditions tend to promote side reactions such as the formation of ethers and hydrocarbons. As the molecular weight of the aromatic compound increases, the hydrogenation of the aromatic nuclei becomes increasingly difficult. This is particularly true where highly branched carbon chains are substituted in the molecule. For this reason, more vigorous hydrogenating conditions are usually required to achieve the desired results in the case of the higher than in the case of the lower alkyl substituted phenols. The more drastic hydrogenating conditions required in the case of the higher alkyl substituted phenols generally leads to the formation of larger proportions of undesired by-products; and consequently, lowers the yield of the corresponding cyclohexanol. The present invention is unique in that the higher alkyl cyclohexanols are produced in high yield by hydrogenation of the higher side chain alkyl substituted phenols, using moderate conditions of temperature and pressure. By the process described herein, side reactions and by-products have been reduced to a minimum and a number of higher alkyl cyclohexanols hitherto unknown have been prepared.

This invention has as an object the preparation of new compositions of matter, namely, side chain alkyl cyclohexanols having the type formula R—C$_6$H$_{10}$OH, where R is an alkyl group containing at least 7 carbon atoms. A further object is the preparation of higher alkyl cyclohexanols by liquid phase catalytic hydrogenation processes using a suitable hydrogenation catalyst such as reduced nickel.

These objects are accomplished by means of the following invention which comprises charging an alkyl substituted phenol, alone or dissolved in a suitable solvent, with a hydrogenation catalyst into an autoclave equipped with a device for mechanical agitation and built to withstand high temperatures and pressures. Hydrogen is forced into the autoclave until the pressure is within the range of approximately 500–3000 pounds per square inch. Hydrogenation occurs at temperatures between 160° C. and 190° C. and thereafter the cooled tube is evacuated and the product separated. The preferred embodiments of this invention are given a fuller description in the following selected examples.

Example 1

A 125 gram sample of heptyl phenol is dissolved in 125 cc. of absolute ethanol and the solution placed in a shaking autoclave with 12.5 grams of nickel-on-kieselguhr catalyst. The mixture is subjected to hydrogen pressures ranging from 1500 to 2500 pounds per square inch and temperatures of 160–190° C. Under these conditions hydrogen is rapidly absorbed and the reaction is complete in about 3 hours. The tube is cooled, and contents removed, the catalyst separated by filtration, and the product isolated by fractional distillation. There is obtained 98.6 grams of pure heptyl cyclohexanol, B. P. 145–148° C. at 20 mm. It is a colorless, somewhat viscous liquid having a faint, spicy odor.

Example 2

A sample of naphthenyl phenol is prepared by condensing a selected fraction of naphthenyl alcohols, said naphthenyl alcohols being obtained by the carboxyl hydrogenation of naphthenic acids from petroleum oils and containing an average of 10.9 carbon atoms, with phenol. One hundred forty-two grams of this product is sealed in a high-pressure autoclave with 14.2 grams of nickel-on-kieselguhr catalyst and hydrogen under pressure is admitted until the total pressure is within the range of from 1800 to 2500 pounds per square inch. The tube and its contents are heated to 170–180° C. to induce hydrogenation which continues over a period of about 4 hours. The product is removed, the catalyst separated by filtration, and the naphthenyl cyclohexanol isolated by distillation. One hundred twenty-four grams of a viscous oil, boiling point range 120–168° C. at 13 mm. is obtained. It has a pleasant odor and its hydroxyl number is in excess of 200.

Example 3

Two hundred grams of dodecyl phenol is charged into a shaking autoclave with 20 grams of reduced nickel-on-kieselguhr catalyst. The mixture is heated to 150–190° C. under a total hydrogen pressure of 1500–2500 pounds per square inch. The absorption of hydrogen ceases in about one hour and the product is separated and distilled. One hundred seventy-seven grams of dodecyl cyclohexanol, B. P. 164–167° C. at 2 mm. is obtained. It is a colorless oil with a faint, pleasant odor. The conversion is 88.5%.

In a similar manner other long chain alkyl phenols, such as octyl, decyl, cetyl, and octadecyl phenols, readily undergo hydrogenation to the corresponding cyclohexanols.

Although in the above examples certain definite conditions of temperature, pressure, concentrations, duration of reaction, etc., are recited, it is to be understood that these conditions are dependent on the individual experiment under consideration and are determined by the nature of the material treated and the catalyst employed. They may, therefore, be varied somewhat within the scope of this invention without departing from the spirit thereof.

In general, the processes of this invention are operative within the temperature range from 100° C. to 250° C. and at pressures ranging from atmospheric to a maximum determined by the bursting point of the reaction vessel. It is most convenient, however, to employ conditions just sufficiently rigorous to accomplish the desired result with a minimum of side reactions and expenditure of time. The preferred catalyst is powdered, reduced nickel supported on an inert material such as kieselguhr. However, other catalysts such as powdered cobalt, copper, copper carbonate or mixed oxide catalysts, such as copper or nickel chromites, may be used. With less active catalysts it is advantageous to employ more rigorous conditions of temperature and pressure.

The hydrogenation of the higher alkyl phenols is best carried out in the absence of a solvent because of the higher batch yield of product but solvents such as methanol, ethanol, isopropanol, benzene, cyclohexane, dioxane, and the like may be used without impairing the efficiency of the operation beyond the effect of dilution.

The processes of this invention are applicable to compounds covered by the generic term "higher monoalkyl phenols having at least 7 carbon atoms in the substituent group". The alkyl groups may be straight or branched chain, or may have alicyclic groups in combination with the above such as occurs in the case of the naphthenyl group. The hydrogenation of heptyl, dodecyl and naphthenyl phenols to the corresponding novel cyclohexanols has been described in the foregoing examples. Others such as octyl, secondary octyl, decyl, tetradecyl, cetyl, and octadecyl phenols are also readily converted to cyclohexanols. Mixed alkyl phenols derived from methanol synthesis by-product alcohols are also valuable raw materials for this invention. It might be mentioned here that it is possible to produce the higher alkyl phenols and the alkyl cyclohexanols concurrently, from the higher acyl phenols, in the same hydrogenation mixture. The first stage of the reaction comprises hydrogenolysis of the ketonic oxygen which is followed by hydrogenation of the aromatic ring to produce the desired alkyl cyclohexanol.

The products of this invention are new and valuable compositions of matter. These products are prepared by a novel, efficient, and economical process of catalytic hydrogenation which is vastly superior to laborious chemical methods, such as reduction with sodium and alcohol, which must otherwise be resorted to in order to obtain them. Furthermore, the processes of this invention are widely applicable to a large variety of substances, which come within its scope, without excessive deviation from the preferred conditions. It is apparent that the processes of this invention are valuable for the preparation of desirable but hitherto unavailable higher alkyl cyclohexanols.

Naphthenyl cyclohexanol, heptyl cyclohexanol, dodecyl cyclohexanol, and other similar products are of interest for a variety of uses such as in wax emulsions, polishes, cosmetic creams, and the like. They may be used in perfumes because of their pleasant odor and high boiling point, and are particularly interesting as soap perfumes. Likewise, they can be converted to esters, ethers, ketones, etc., which find application in the field of cellulose derivative plastics, wax blending agents, coated fabrics, and in paints, varnishes, and resins. Sulfonated and phosphated alkyl cyclohexanols may be employed as detergents, emulsifying agents, textile finishing agents, or as extreme pressure lubricants. They are also of potential interest as modifying agents for lubricating oils and as insecticides or fly sprays.

The term "naphthenyl", as used herein and in the claims, refers to the naphthenyl radical contained in naphthenyl alcohols, said naphthenyl alcohols being obtained by the carboxyl hydrogenation of naphthenic acids from petroleum oils.

It is apparent that many widely different embodiments of this invention may be made without departing from the spirit and scope thereof, and, therefore, it is not intended to be limited except as indicated in the appended claims.

We claim:

1. The process which comprises catalytically hydrogenating mononuclear monohydric phenol which is alkyl substitued, said alkyl group containing at least seven carbon atoms, at a temperature within the range of 100°–250° C.

2. The process in accordance with claim 1 characterized in that the reaction is carried out at a temperature of about 150° to about 190° C.

3. The process in accordance with claim 1 characterized in that the reaction is carried out at a pressure of 500 to 3000 pounds per square inch.

4. The process in accordance with claim 1 characterized in that the phenol is hydrogenated while in solution in an organic solvent.

5. The process in accordance with claim 1 characterized in that the phenol is hydrogenated while in solution in ethanol.

6. The process which comprises reacting a mononuclear monohydric phenol which is monoalkyl substituted, said alkyl group containing at least seven carbon atoms, with hydrogen in the presence of a nickel catalyst at a temperature within the range of 100°–250° C.

7. The process in accordance with claim 6 characterized in that the catalyst is a nickel on kieselguhr catalyst.

8. The process in accordance with claim 6 characterized in that the reaction is carried out under a pressure of 500 to 3000 pounds per square inch.

9. The process in accordance with claim 6 characterized in that the reaction is carried out at a temperature of 150°–190° C. and at a hydrogen pressure of 1000 to 3000 pounds per square inch.

10. The process which comprises reacting heptyl phenol with hydrogen in the presence of a nickel catalyst at a temperature within the range of 100°–250° C.

11. The process in accordance with claim 10 characterized in that the reaction is carried out at a temperature of about 160° to about 190° C.

12. The process in accordance with claim 10 characterized in that the reaction is carried out at a pressure of about 500 to about 3000 pounds per square inch.

13. The process which comprises reacting heptyl phenol, while in solution in ethanol, with hydrogen in the presence of a nickel on kieselguhr catalyst at a temperature of about 160° to about 190° C. and at a pressure of about 1500 to about 2500 pounds per square inch.

14. The process which comprises reacting a naphthenyl phenol with hydrogen in the presence of a nickel catalyst at a temperature within the range of 100°–250° C.

15. The process in accordance with claim 14 characterized in that the reaction is carried out at a temperature of about 170° to about 180° C.

16. The process in accordance with claim 14 characterized in that the reaction is carried out at a pressure of about 500 to about 3000 pounds per square inch.

17. The process which comprises reacting a naphthenyl phenol with hydrogen in the presence of a nickel-on-kieselguhr catalyst at a temperature of about 170° to about 180° C. and at a pressure of about 1800 to about 2500 pounds per square inch.

18. The process which comprises reacting dodecyl phenol with hydrogen in the presence of a nickel catalyst at a temperature within the range of 100°–250° C.

19. The process in accordance with claim 18 characterized in that the reaction is carried out at a temperature of about 150° to about 190° C.

20. The process in accordance with claim 18 characterized in that the reaction is carried out at a pressure of about 500 to about 3000 pounds per square inch.

21. The process which comprises reacting dodecyl phenol with hydrogen in the presence of a nickel-on-kieselguhr catalyst at a temperature of about 150° to about 190° C. and at a pressure of about 1500 to about 2500 pounds per square inch.

22. A mononuclear monohydric cyclohexanol which is monoalkyl substituted, said alkyl group containing at least seven carbon atoms.

23. Heptyl cyclohexanol.

24. A naphthenyl cyclohexanol.

25. Dodecyl cyclohexanol.

BENJAMIN W. HOWK.
MERLIN MARTIN BRUBAKER.